United States Patent
Roby (10) Patent No.: US 9,217,476 B2
(45) Date of Patent: *Dec. 22, 2015

(54) FRICTION CLUTCH ASSEMBLIES (75) Inventor: Joshua L. Roby, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/008,600

(22) PCT Filed: Apr. 10, 2012

(86) PCT No.: PCT/US2012/032863
§ 371 (c)(1),
(2), (4) Date: Sep. 30, 2013

(87) PCT Pub. No.: WO2012/142016
PCT Pub. Date: Oct. 18, 2012

(65) Prior Publication Data
US 2014/0322041 A1 Oct. 30, 2014

Related U.S. Application Data (60) Provisional application No. 61/474,862, filed on Apr. 13, 2011, provisional application No. 61/474,876, filed on Apr. 13, 2011, provisional application No. 61/474,928, filed on Apr. 13, 2011, provisional application No. 61/474,907, filed on Apr. 13, 2011, provisional application No. 61/474,895, filed on Apr. 13, 2011.

(51) Int. Cl.
| | |
|---|---|
| *F16D 27/11* | (2006.01) |
| *F16D 13/38* | (2006.01) |
| *F04D 13/02* | (2006.01) |
| *F01P 5/12* | (2006.01) |
| *F02B 67/06* | (2006.01) |
| *F16H 55/36* | (2006.01) |
| *F16D 27/112* | (2006.01) |
| *F16D 13/71* | (2006.01) |
| *F16F 1/02* | (2006.01) |
| *F16D 27/00* | (2006.01) |

(52) U.S. Cl.
CPC . *F16D 13/38* (2013.01); *F01P 5/12* (2013.01); *F02B 67/06* (2013.01); *F04D 13/021* (2013.01); *F16D 13/71* (2013.01); *F16D 27/11* (2013.01); *F16D 27/112* (2013.01); *F16F 1/027* (2013.01); *F16H 55/36* (2013.01); *F16D 2027/007* (2013.01)

(58) Field of Classification Search
None
See application file for complete search history.

(56) References Cited

U.S. PATENT DOCUMENTS

| | | | | |
|---|---|---|---|---|
| 3,748,888 | A * | 7/1973 | Gerich | 72/375 |
| 3,788,099 | A * | 1/1974 | Miller | 464/98 |
| 3,951,393 | A * | 4/1976 | Smirl | 267/161 |
| 4,566,575 | A * | 1/1986 | Sekella | 192/84.95 |

(Continued)

Primary Examiner — Rodney H Bonck (57) ABSTRACT

A friction clutch assembly, preferably for a hybrid cooling pump. The friction clutch assembly includes a friction lining carrier member, a friction lining member, a compression spring member, a clutch carrier member and a flux plate member. A solenoid can be utilized to control the compression of the spring member. The friction clutch assembly has a preferred use in a hybrid coolant pump with two modes of operation, an electric motor operation, and a mechanical pulley-driven operation. The friction clutch assembly can be positioned inside a motor housing. The softening compression spring can minimize parasitic clutch power consumption.

10 Claims, 9 Drawing Sheets

(56) References Cited

U.S. PATENT DOCUMENTS

| | | | |
|---|---|---|---|
| 4,623,991 A * | 11/1986 | Vitringa | 367/183 |
| 4,793,601 A * | 12/1988 | Wild et al. | 267/165 |
| 5,377,799 A * | 1/1995 | Mullaney | 192/84.94 |
| 2010/0122882 A1 * | 5/2010 | Komorowski et al. | 192/35 |
| 2014/0023526 A1 * | 1/2014 | Roby | 417/223 |
| 2014/0023527 A1 * | 1/2014 | Roby | 417/362 |
| 2014/0116834 A1 * | 5/2014 | Roby | 192/66.32 |
| 2014/0158492 A1 * | 6/2014 | Roby | 192/66.31 |

* cited by examiner

FRICTION CLUTCH ASSEMBLIES

CROSS-REFERENCE TO RELATED APPLICATIONS

This application claims priority to U.S. Patent Application Ser. No. 61/474,928, which is related to U.S. Patent Application Ser. No. 61/474,862 entitled Hybrid Coolant Pump, U.S. Patent Application Ser. No. 61/474,876 entitled Pulley Assemblies For Vehicle Accessories, U.S. Patent Application Ser. No. 61/474,907 entitled Compression Spring Members, and U.S. Patent Application Ser. No. 61/474,895 entitled Control Systems For Friction Clutch Assemblies, all filed on Apr. 13, 2011.

TECHNICAL FIELD

Friction clutch assemblies particularly for hybrid coolant pumps, are disclosed.

BACKGROUND

Water pumps are used in water cooled engines, primarily for operation of vehicles such as automobiles and trucks with internal combustion engines. The water pumps are typically driven by a belt attached to the crankshaft of the engine and thus operate at some percentage of engine speed. The pumps have an impeller that is used to circulate the engine coolant from the engine to the radiator and back in order to keep the coolant within acceptable temperature limits.

Efforts are being made today to reduce the power consumption of engine accessories, such as water pumps, in order to improve fuel economy and reduce emissions. It would thus be preferable if such accessories, including water pumps, could be made to operate at variable speeds or with less power in order to reduce the load on the engine and, in turn, improve fuel economy and reduce undesirable emissions from the engine.

SUMMARY OF THE INVENTION

An improved water pump utilizing an improved friction clutch assembly is disclosed. The water pump has two modes of operation, a first mode mechanical driven by the engine belt, and a second mode operated by an electric motor, such as a brushless DC (BLDC) motor.

The components for the two modes of operation are contained within a housing that includes the pulley member as part of the housing. A shaft connected to the impeller of the water pump is positioned in the housing and is controlled by one mode of operation or the other, depending on certain factors.

The housing is turned at input speed by the belt of the engine positioned on the pulley member. The friction clutch assembly is positioned inside the housing to selectively allow operation of the water pump mechanically by the pulley member. A solenoid can be utilized to control operation of the friction clutch assembly.

The water pump is normally driven by the electric motor throughout most of its range of operation. Where peak cooling requirements are needed, the mechanical mode of operation takes over and the water pump is driven directly by the pulley member. The friction clutch assembly can include a softening spring member which minimizes the electrical power consumed by the clutch. The hybrid cooling pump can utilize a variable speed control which results in the use of less power, the improvement of fuel economy, and the reduction of emissions.

The friction clutch assembly has numerous uses other than for hybrid water pumps and can be utilized in other engine components and accessories. A preferred embodiment of the friction clutch assembly includes a friction lining carrier member, a friction lining member, a compression spring member, a clutch carrier member and a flux plate member.

Further objects, features and benefits of the invention are set forth below in the following description of the invention when viewed in combination with the drawings and claims.

DESCRIPTION OF THE PREFERRED EMBODIMENTS

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein particularly relate to friction clutch assemblies used for hybrid water pumps used to circulate the coolant in an engine, such as an automobile internal combustion engine. However, the present invention can also be used for other engine accessory devices. Also, several of the other components, mechanisms and systems described herein, including, but not limited to, the compression spring members, the pulley assembly and/or the PWM control system, can have significant uses in other devices and systems.

As a coolant pump, the pump is electrically driven under most conditions. However, it also can be mechanically engaged where more cooling is required. Thus, when the vehicle is being driven under most normal conditions, the water pump is being driven and operated by the electric motor.

During "worst case" cooling conditions, such as when the vehicle is heavily loaded, when it is pulling a trailer, when it is going up hill in the summertime, etc., the water pump is adapted to be mechanically driven by the belt directly from the engine. This provides the necessary cooling under such circumstances.

In accordance with a preferred embodiment of the invention, the electric motor is a brushless DC (BLDC) motor and the motor is positioned inside a pulley assembly. The pump is also adapted to be driven mechanically when needed by the engine belt, such as a serpentine belt, attached to the crankshaft of the engine.

The preferred embodiment of the present invention as described herein is particularly adapted for use with trucks, passenger cars and off-highway vehicles. Since the preferred embodiment also provides variable speed control of the water pump, it uses less power from the engine and thus improves fuel economy and reduces emissions.

Figures 1, 2:
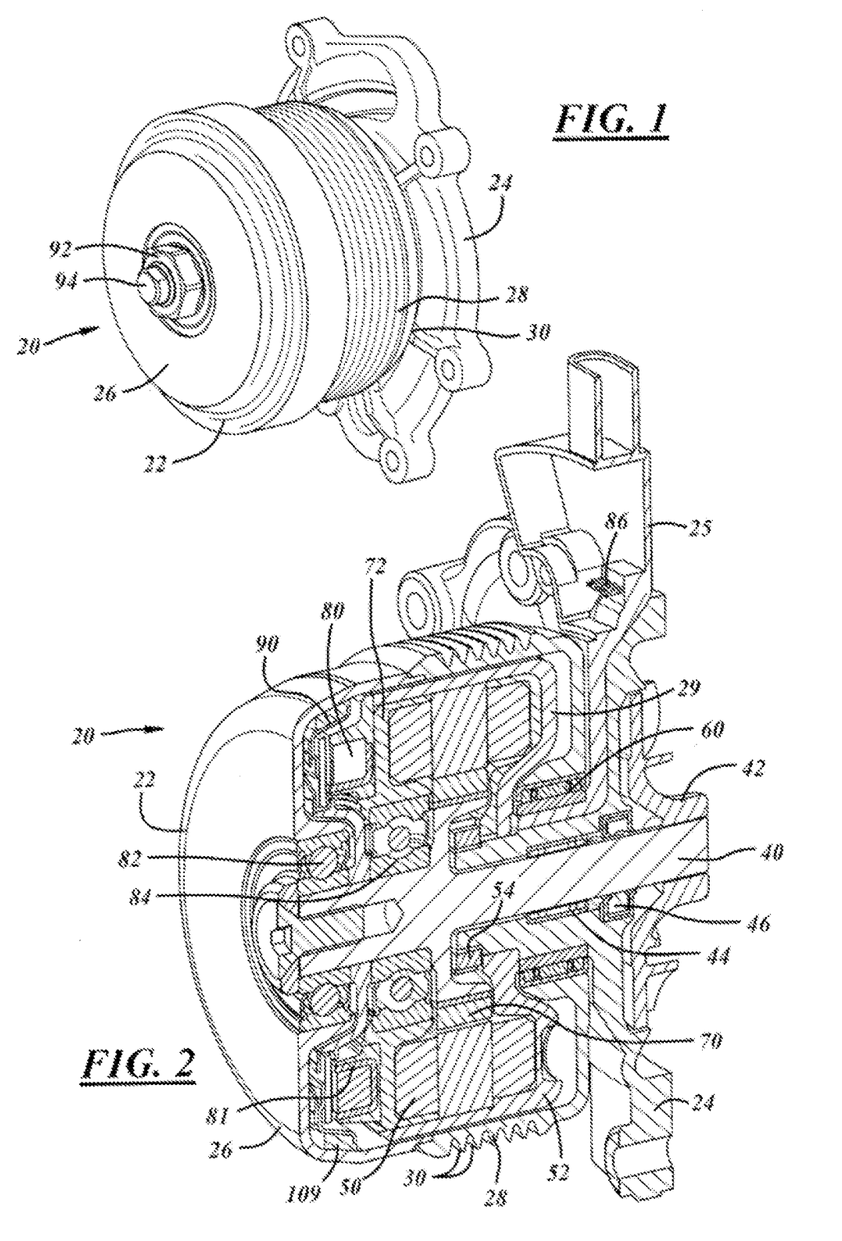
FIG. 1 illustrates a water pump in accordance with one embodiment of the invention.
FIG. 2 is a cross-sectional view of the water pump shown in FIG. 1.

A hybrid water pump embodiment in accordance with the present invention is shown in FIG. 1 and referred to generally by the reference numeral 20. The hybrid water pump includes a pulley assembly 22 and a water pump housing 24. The pulley assembly 22 has a clutch housing member 26 and a pulley member 28. The pulley member 28 has circumferential grooves 30 for being driven by a belt (not shown).

Figure 3:
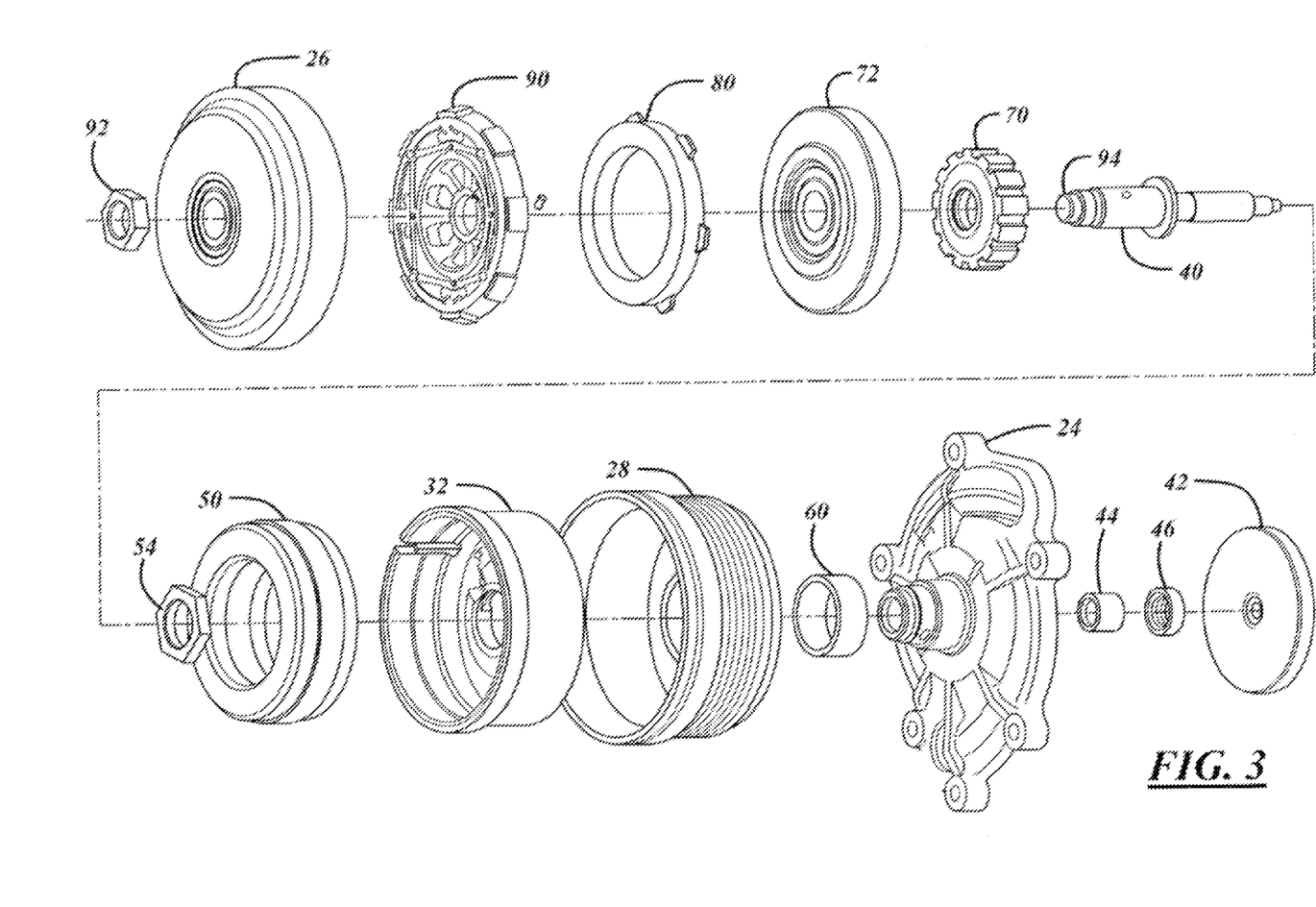
FIG. 3 is an exploded view of the components of the water pump as shown in FIGS. 1 and 2.

A cross-sectional view of the water pump 20 is shown in FIG. 2 and an exploded view of the components of the water pump 20 is shown in FIG. 3.

The water pump has an impeller shaft 40 which is positioned within the pulley assembly 22 and also is attached to a water pump impeller 42. The impeller shaft 40 is held in place in the pump housing 24 by needle bearing 44 and middle bearing 84. A coolant seal 46 is used to prevent coolant in the pump from leaking into the pulley assembly.

A motor stator 50 is positioned inside a stator housing 52 in the pulley assembly 22. A nut, such as a spanner nut 54, is used to hold the stator housing 52 to the pump housing 24.

A second needle bearing 60 is positioned between the pulley member 28 and the pump housing 24 in order to allow the pulley assembly 22 to rotate freely relative to the pump housing.

A motor rotor 70 is positioned inside a front bearing carrier 72, which preferably is made from an aluminum material. The motor is preferably a brushless DC (BLDC) electric motor. A solenoid member 80 is positioned immediately adjacent the front bearing carrier 72. A friction clutch assembly 90 is positioned adjacent the front cover of the motor housing 22 and operated by the solenoid member 80. Bearing member 84 is positioned between the bearing carrier 72 and the impeller shaft 40.

A fastening member such as a hex nut 92 secures the pulley assembly 22 to the impeller shaft 40 via the front bearing 82. As indicated particularly in FIGS. 2 and 3, the pulley assembly 22 consists of two pieces, namely a pulley member 28 and clutch housing 26. This configuration provides for distribution of the belt load between the rear needle bearing 60 and the front ball bearing 82, thereby eliminating overhung bearing loads. Consequently, the bearing loads are minimized resulting in a more durable and long-lasting product.

As indicated, the water pump is normally driven by the electric motor. The electric motor is electrically powered through a circuit board (not shown) connected to pin-type contact members 86. Electrical leads and wires can be insert molded in housing 25 and lead frame 29 in order to carry the electrical signals to the electric motor stator 50 and solenoid 80. The circuit board further communicates with the electronic control unit (ECU) of the vehicle through the vehicle communication network such as a CAN network. The pump controller circuit board could also be positioned inside the pulley assembly 22 rearward of the stator housing 52 and having a donut shape.

The speed of the motor and thus the water pump is selected according to the cooling required for the engine. Sensors feed relevant data to the ECU which then sends a signal to the pump controller requesting the desired speed. The pump controller then determines whether the desired speed is best achieved using the electric motor or by engaging the friction clutch and driving the impeller directly from the pulley.

Figure 13:
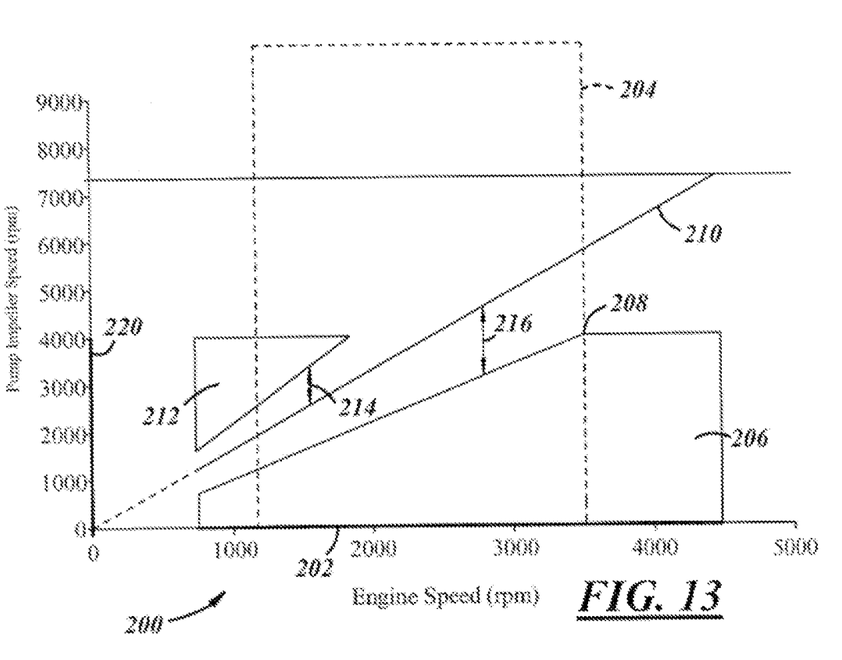
FIG. 13 schematically illustrates the operating modes of a preferred embodiment of the present invention.

FIG. 13 is a graph 200 schematically illustrating the functional modes of the hybrid pump. The speed of the engine is shown along the X-axis and the speed of the impeller is shown along the Y-axis in FIG. 13. Both speeds are shown in revolutions per minute (RPM).

The principal electric drive mode of the hybrid pump drive is shown at 206. Peak torque is achieved by electric motor 208. Full pulley drive (a/k/a "belt drive") is shown by line 210. Here the pump is being driven mechanically by the engine through the accessory belt. The slope of line 210 may be changed by modifying the pulley ratio between the engine crank pulley and the pump pulley member 28.

An optional electrical drive area is shown at 212. This area represents the region in which the electric motor is able to provide an "over-drive" feature where the pump can be spun at speeds greater than the mechanical input speed. The regions 214 and 216 are due to the efficiency loss in the electric drive mode from converting mechanical energy to electrical energy in the alternator and then back to mechanical energy in the electric motor. Although the pump could be operated electrically in regions 214 and 216, it is more energy efficient for the pump to jump to the mechanical drive mode 210. In 202, the pump is OFF and the impeller is not rotating. In this embodiment, the pump is OFF regardless of the speed of the engine. It is also possible to drive the pump electrically when the engine is turned off. This is shown at 220.

Figure 4:
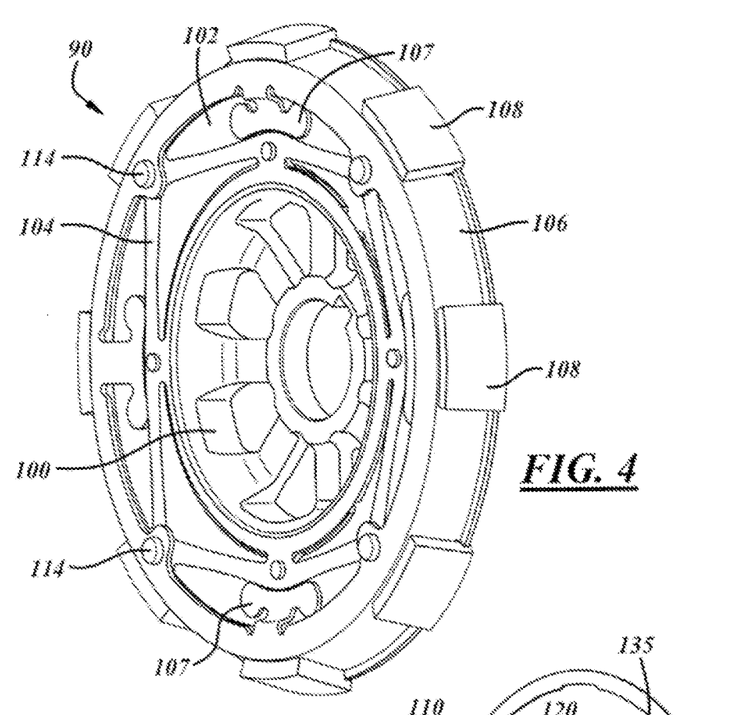
FIG. 4 illustrates a friction clutch embodiment which can be used in accordance with the present invention.
Figure 5:
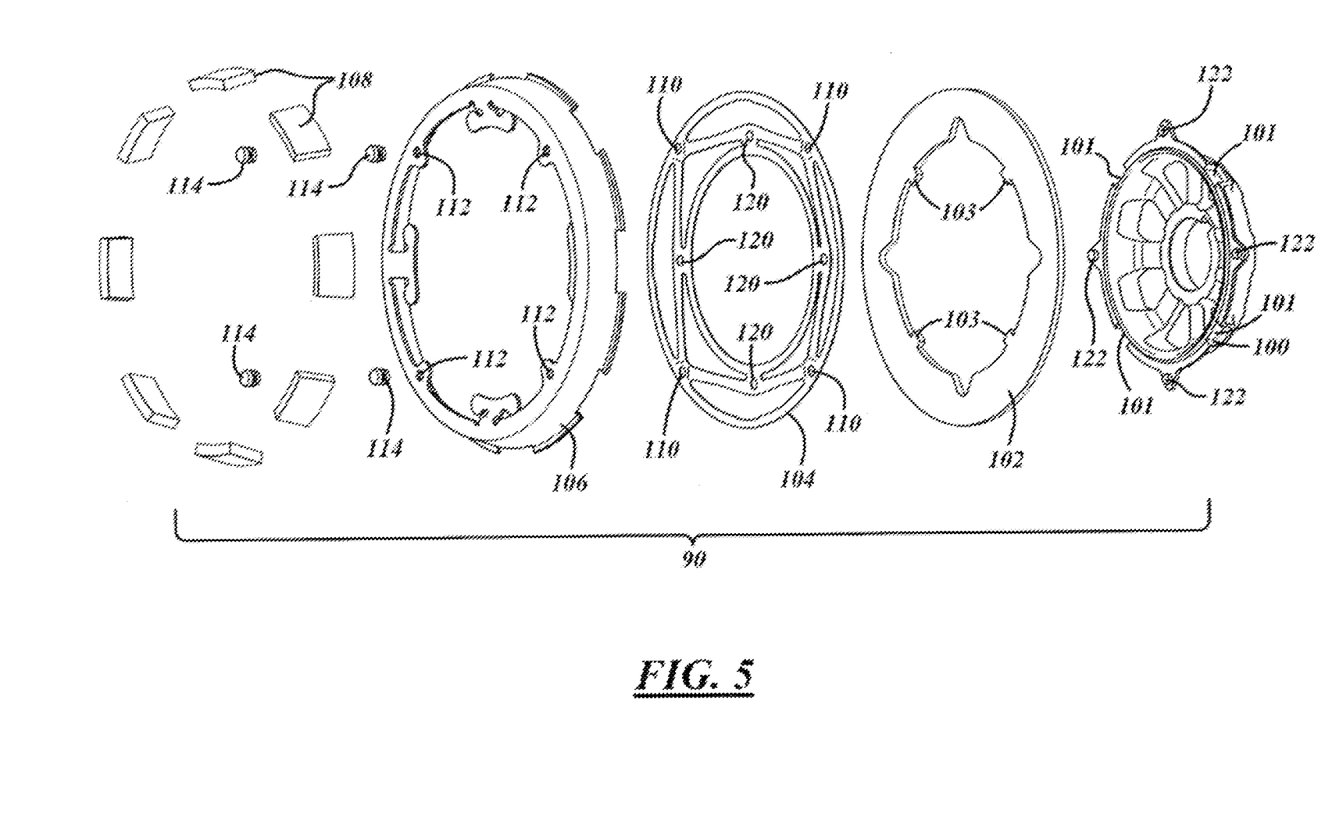
FIG. 5 is an exploded view of the friction clutch as shown in FIG. 4.

An enlarged view of the friction clutch 90 is shown in FIG. 4, while an exploded view of the components of the friction clutch 90 is shown in FIG. 5. The friction clutch 90 includes a clutch carrier member 100, a flux plate member 102, a compression spring member 104, and a friction lining carrier member 106. Pieces of friction lining material 108 are attached to its outer circumference of the carrier 106, as shown in FIG. 4. The friction lining members 108 can be of any conventional friction material and can be of any size and shape. Although the friction lining material is shown with a plurality of separate members, as shown in FIGS. 4 and 5, the friction lining can be a single piece or any number of separate members positioned around the circumference of the friction lining carrier member 106.

The friction lining material will wear over time as the hybrid pump is utilized. As this takes place, the capacity of the friction clutch 90 will increase due to the design of the compression spring member 104 which develops more force as the lining material wears.

Figure 6:
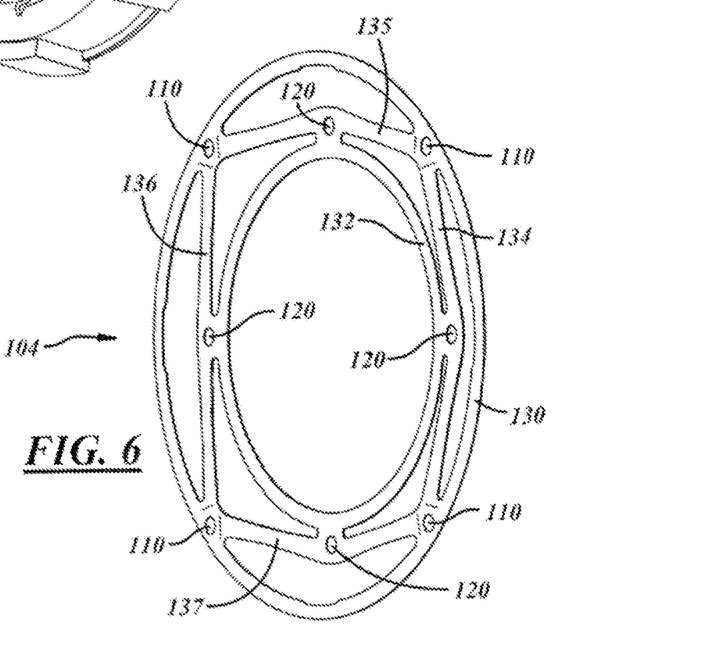
FIG. 6 is an embodiment of a compression spring which can be used with the present invention.

An enlarged view of one embodiment of a compression spring member 104 is shown in FIG. 6. The spring member 104 is a "softening" spring member since the force necessary to compress it decreases over time once it reaches a certain peak.

The spring member 104 has a plurality of holes or openings in order to be attached to the friction lining carrier member and the clutch carrier member. In this regard, a series of four holes 110 are provided on the compression spring member 104 in order to mate with openings 112 in the friction lining carrier member 106. A plurality of rivets 114 or the like are used to secure the compression spring member 104 to the friction lining carrier member 106. The compression spring member can be joined to the friction lining carrier member by any conventional method, such as by welding, brazing, threaded fasteners, etc.

The second series of openings in the compression spring member include four openings 120. These openings mate with corresponding post members 122 on the clutch carrier member 100. The post members 122 are deformed or swaged over when the friction clutch assembly 90 is assembled in order to securely hold the components of the friction clutch assembly together.

When the friction clutch assembly 90 is in the engaged position, torque is transferred from the pulley assembly 22 through the friction lining members 108 to the friction lining carrier 106. The friction lining carrier then transfers torque through the compression spring member 104 to the clutch carrier 100 which turns the impeller shaft.

Figure 8:
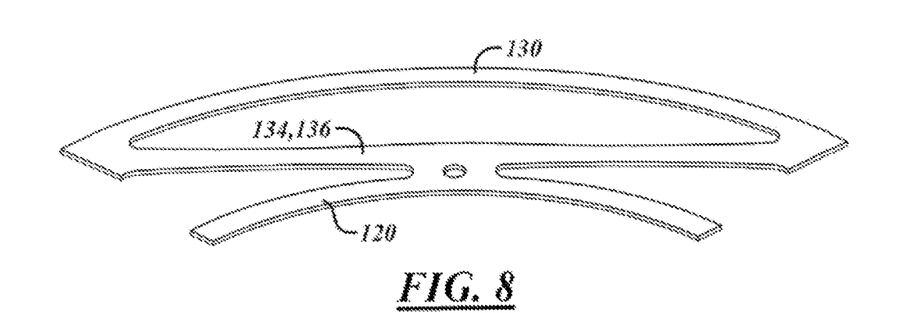
FIG. 8 is an enlarged view of a portion of the compression spring member in the uncompressed condition.
Figure 9:
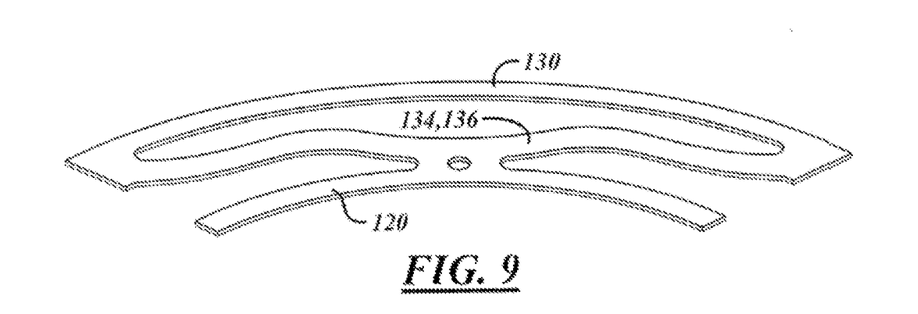
FIG. 9 is an enlarged view of a portion of the compression spring member in the compressed condition.

The compression spring member embodiment 104 has an outer ring member 130 and an inner ring member 132. The two ring members 130 and 132 are connected together by a plurality of connecting members 134, 135, 136 and 137. Enlarged portions of the compression spring member 90 are shown in FIGS. 8 and 9. When the spring member 104 is assembled in the friction clutch assembly 90, the outer and inner ring members 130 and 132, respectively, are held securely in place and are fixed so they cannot be moved radially toward or away from each other during operation of the friction clutch assembly.

Figure 7:
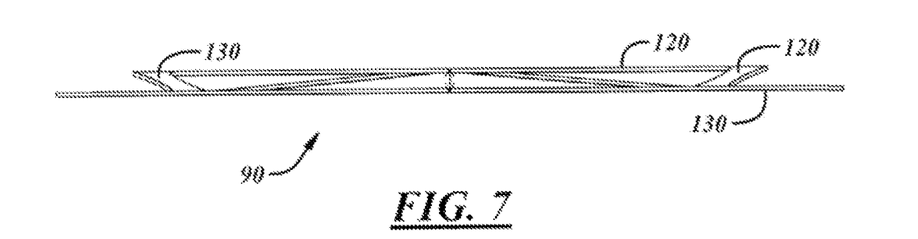
FIG. 7 is a side view of the compression spring member as shown in FIG. 6.

In FIG. 8, the compression spring member is shown in the uncompressed position. This is also shown in FIGS. 6 and 7.

Figure 10:
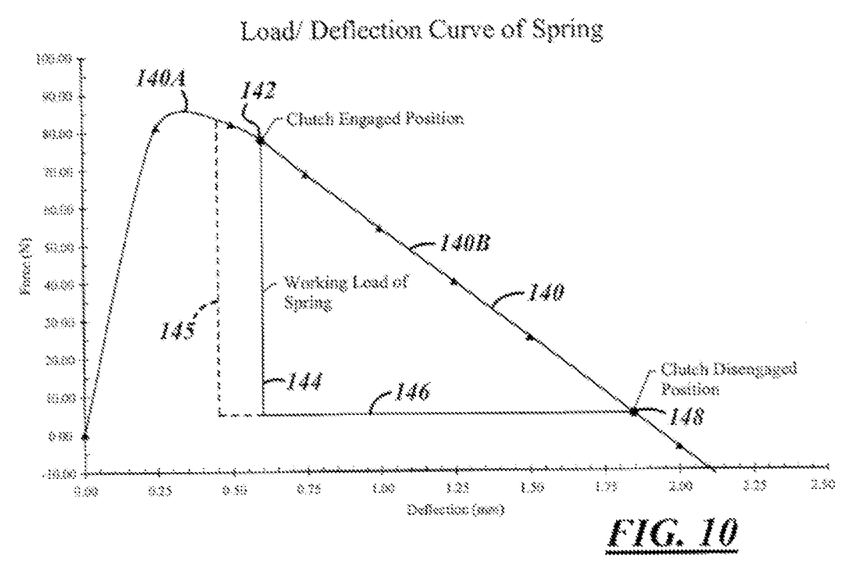
FIG. 10 is a load-deflection curve of an embodiment of a compression spring member for use with the present invention.

When the spring member 90 is compressed to the position 142 shown in FIG. 10, the spring member forces the friction lining carrier member 106 and friction lining members 108 against the conical friction surface 109 (FIG. 2) inside of the clutch housing member 26 causing mechanical operation of the water pump. The clutch housing member 26 can be aluminum and the conical friction surface can be thermal spray coated with a variety of materials such as low carbon steel.

When the friction clutch assembly 90 is energized by the solenoid 80, the flux plate 102 is attracted to the solenoid assembly due to the force developed in the air gap between the solenoid core 81 and the flux plate. As the flux plate 102 moves toward the solenoid, the compression spring member 104 is compressed separating the friction lining carrier member 106 and friction members from their engaged positions against the inside surface of the clutch housing member 26. In the compressed condition, the connecting members 134, 135, 136 and 137 are buckled and distorted such as in the manner schematically depicted in FIG. 9. In this position, the water pump is operated only by the electric motor.

The flux plate 102 is securely attached to the friction lining carrier 106 through tabs 107 (FIG. 4). The attachment of the flux plate and friction lining carrier may be through any conventional joining technique such as spot welding, screws, rivets, or the like.

Axial travel of the clutch assembly is limited by the engagement of tabs 103 on the flux plate 102 within pockets 101 on the clutch carrier member 100 (FIG. 5). This axial travel limit prevents the pole plate from coming into contact with the solenoid core member 81 as the pole plate rotates with impeller speed and the solenoid core is stationary.

The load/deflection curve of the compression spring member 104 in accordance with a preferred embodiment is shown in FIG. 10. As shown in FIG. 10, the load/deflection curve 140 reaches quickly to a maximum amount of force 140A and then needs less force in order to continue to deflect the spring member after it is starting to buckle and deform. This is shown by the second part of the curve 140B. This means that once the compression spring has reached point 140A, less force is needed to further deflect the spring and thus prevent the friction clutch assembly from contacting the inside of the housing. In this regard, the clutch engaged position is shown at point 142, the working load of the spring is indicated by line 144, the working length of the spring is shown by line 146, and the clutch disengaged position is shown at point 148. Thus, once the maximum amount of force necessary to buckle or deform the spring is reached, increasingly less force is necessary in order to deflect the spring further and thus allow complete operation of the water pump by the electric motor. The softening spring member thus enables the parasitic electric power consumption of the clutch disengagement solenoid 80 to be minimized. This is accomplished by pulse width modulating ("PWM") the current supplied to the solenoid. To disengage the solenoid the solenoid drive controller operates the solenoid drive Field Effect Transistor ("FET") at 100% PWM so full current is supplied to the solenoid. The controller has a current sensing technology such that when the clutch seats in the fully disengaged position it is able to sense the current change indicating the clutch is disengaged. At this point, the controller drops the PWM to a smaller level such as 10%, so less current is consumed by the solenoid. Since the compression spring 104 develops much less force in this position 148 as shown in FIG. 10 and the magnetic circuit is much more efficient as the air gap is smaller, the lower current level is still adequate to keep the clutch in the disengaged position.

It is quite common in automotive accessories such as air conditioning compressors, pumps, etc. to use spring engaged, electromagnetically disengaged clutches to selectively turn on and off the drive to the accessory component. This is typically done to conserve energy when the device is not needed. These devices are typically designed to be spring engaged so the accessory device is powered in the event of a control failure such as a loss of electrical power. This is done to provide "Fail-Safe" functionality meaning that the device defaults to its "on" state when it is unpowered.

The primary disadvantage of these "Fail-Safe" clutch designs is that they require continuous electrical power to keep the device disengaged when it is not needed. For many accessory devices this condition can constitute a large percentage of their operating life. Furthermore, these devices often require 20+ watts of electrical power, which can be a significant portion of the alternator output. On modern vehicles which employ a large number of electrical components (seat heaters, window defrosters, electric seats, and a host of other devices), it is not uncommon to exceed the maximum power capacity of the alternator.

A preferred embodiment of the present invention provides a means of mitigating this problem by minimizing the parasitic power consumed by electromagnetically disengaged clutches. Fundamentally this arrangement takes advantage of the physical relationship between the force developed in the air gap of a magnetic circuit and the length of the air gap. This relationship is described by the following Equation where $m_1$ and $m_2$ are the respective field strengths of the two poles of the magnetic circuit, $\mu$ is the permeability of the free space and r is the distance between the poles.

$$F = \frac{\mu_0 m_1 m_2}{4\pi r^2}$$

From the equation it is evident that the field strength falls off with the square of the distance between the magnet poles. Furthermore, it evident from FIG. 17 that the spring force used to engage the clutch will increase linearly when the solenoid is energized and the air gap closes. This means that the solenoid will have excess capacity in its closed position since the magnetic field strength increases with the square of distance and the counteracting spring force only increases linearly with distance. Since the field strength of the magnetic poles are related to the current flowing through the coil and the number of coil turns, it is evident that less current is required to hold the clutch in the disengaged position than what is required to pull the clutch out of engagement. Furthermore, if the clutch engagement spring is designed in such a way that the spring softens as it is compressed as described herein, this effect will be even further pronounced.

Figures 15, 17, 18:
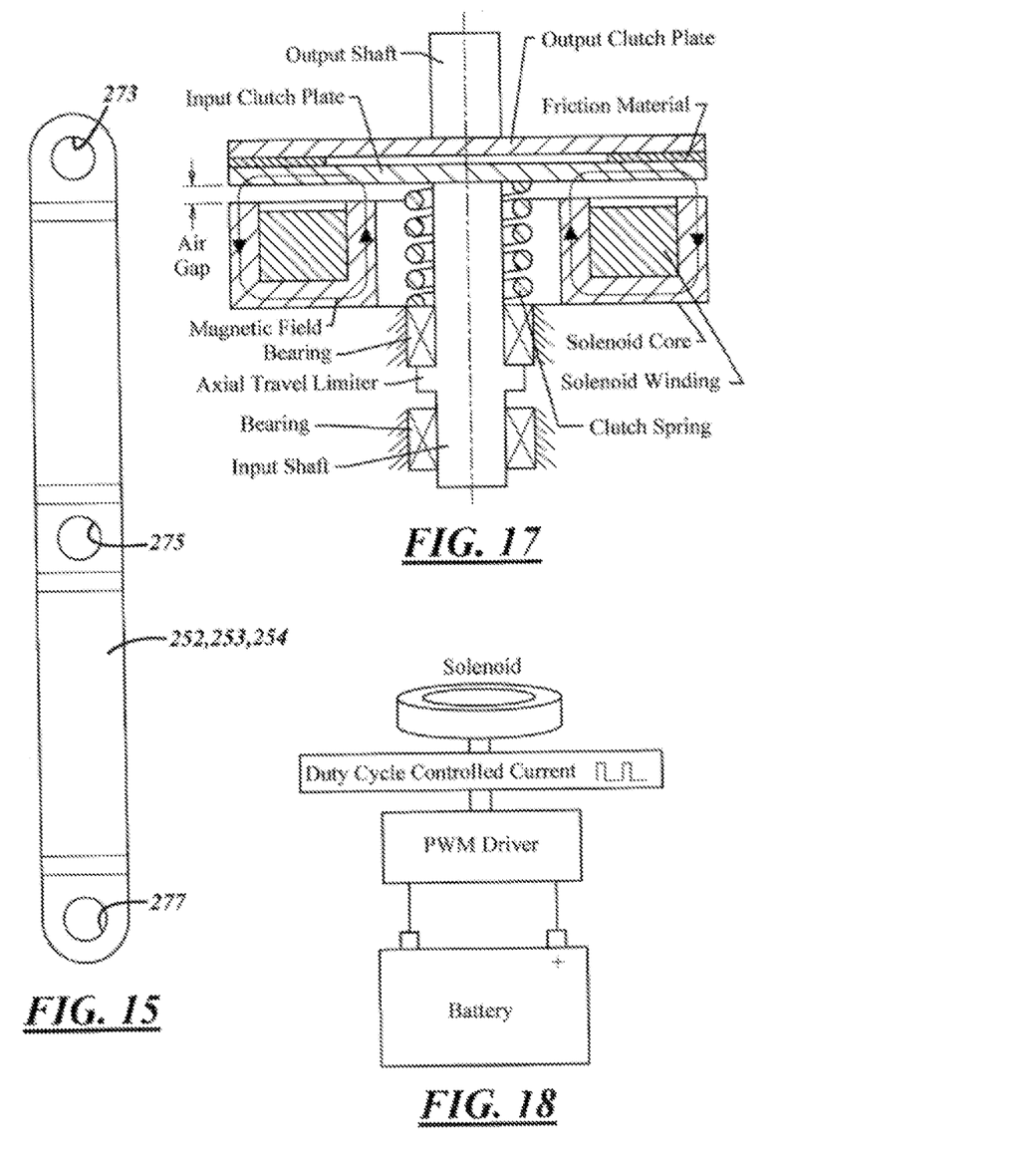
FIG. 17 schematically illustrates an electromagnetic clutch mechanism.
FIG. 18 schematically illustrates a solenoid control system.

To capitalize on this condition, the present invention employs a PWM (Pulse Width Modulation) control system for the solenoid as shown in FIG. 18. The PWM control system uses a PWM Driver (typically a Field Effect Transistor and supporting circuitry) to pulse the solenoid power on and off at a very high speed, typically on the order of a few hundred hertz. Since the solenoid provides a relatively large inductance which prevents the current from changing instantaneously, this has the effect of reducing the average current delivered to the solenoid. The average current level can then be controlled by varying the duty cycle of the PWM Driver.

With this methodology, the PWM Driver is used to apply 100% duty cycle or full current to the solenoid to generate the maximum force in the air gap to pull the clutch out of engagement. Once the clutch is in the disengaged position, the duty cycle can be reduced to a much lower level, effectively reducing the average current supplied to the solenoid and consequently reducing the power consumption.

The PWM Driver can furthermore incorporate current sensing technology in such a way that a microcontroller is able to monitor the current supplied to the solenoid. This is advantageous in that a current spike will be evident on the solenoid supply line when the moving pole of the solenoid seats against the travel limit. This current spike can be used as a signal to the microprocessor that the clutch is in its retracted position and the duty cycle can be reduced.

Figure 11:
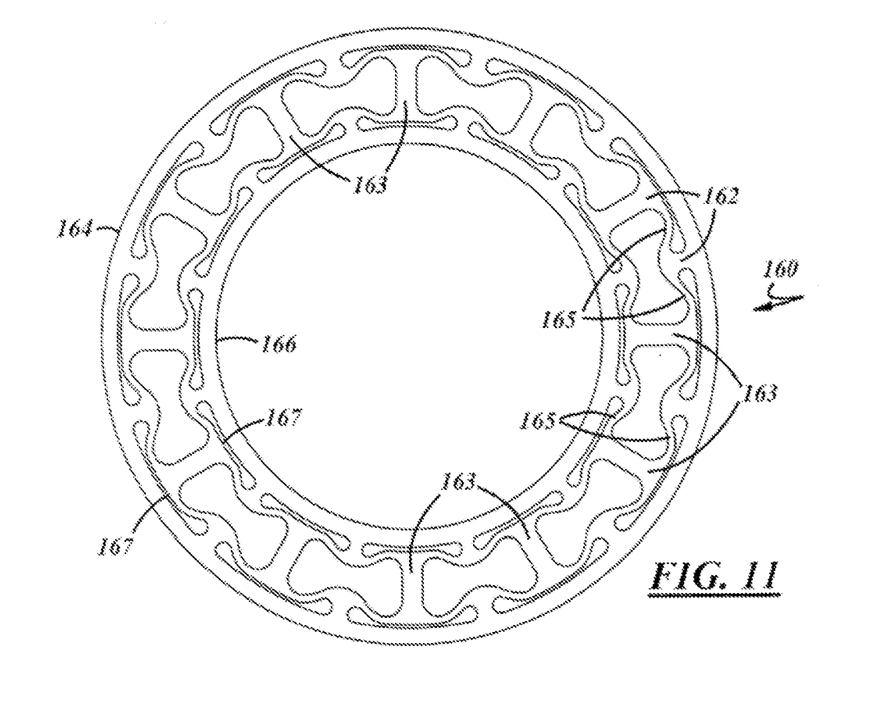
FIG. 11 illustrates an alternate embodiment of a compression spring member which can be used with the present invention.

An alternate form of a compression spring 160 is shown in FIG. 11. In this embodiment, a series of connector members 162 are positioned between an outer ring 164 and an inner ring 166. When compression spring member 160 is used in a friction clutch assembly, the outer and inner ring members 164 and 166 respectively, are constrained and fixed in place.

The inner connecting members 162 are comprised of radial compression beams 163 and tangential flex arms 165. When the spring is compressed, the tangential flex arms deform allowing the radial gaps 167 to close as the spring flattens.

Figure 12:
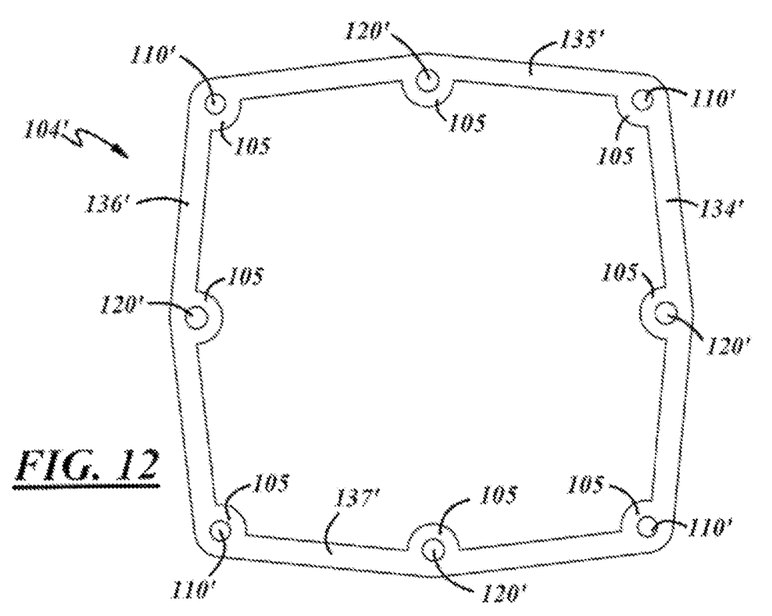
FIG. 12 depicts another alternate embodiment of a compression spring member which can be used with the present invention.

Another alternate embodiment of a compression spring member which can be used with the present invention is shown in FIG. 12. The spring member 104' is similar to spring member 104 described above, but does not have outer or inner ring members. Instead, spring member 104' has a plurality of connecting members 134', 135', 136' and 137' which extend between the areas 105 of the openings 110' and 120'. The latter openings 110' and 120' are the same as, in the same locations as, and for the same functions and purposes as, openings 110 and 120 in FIGS. 4-6.

When the compression spring member 104' is utilized in a friction clutch assembly, the connecting members 134', 135', 136' and 137' deform and buckle similar to connecting members 134-137 described above providing a similar "softening" spring member.

Another compression spring member (not shown) can be similar to the spring member 104 in FIG. 6, but only comprise an inner ring member or an outer spring member (i.e. not both), together with a plurality of connecting members.

Figures 14, 16:
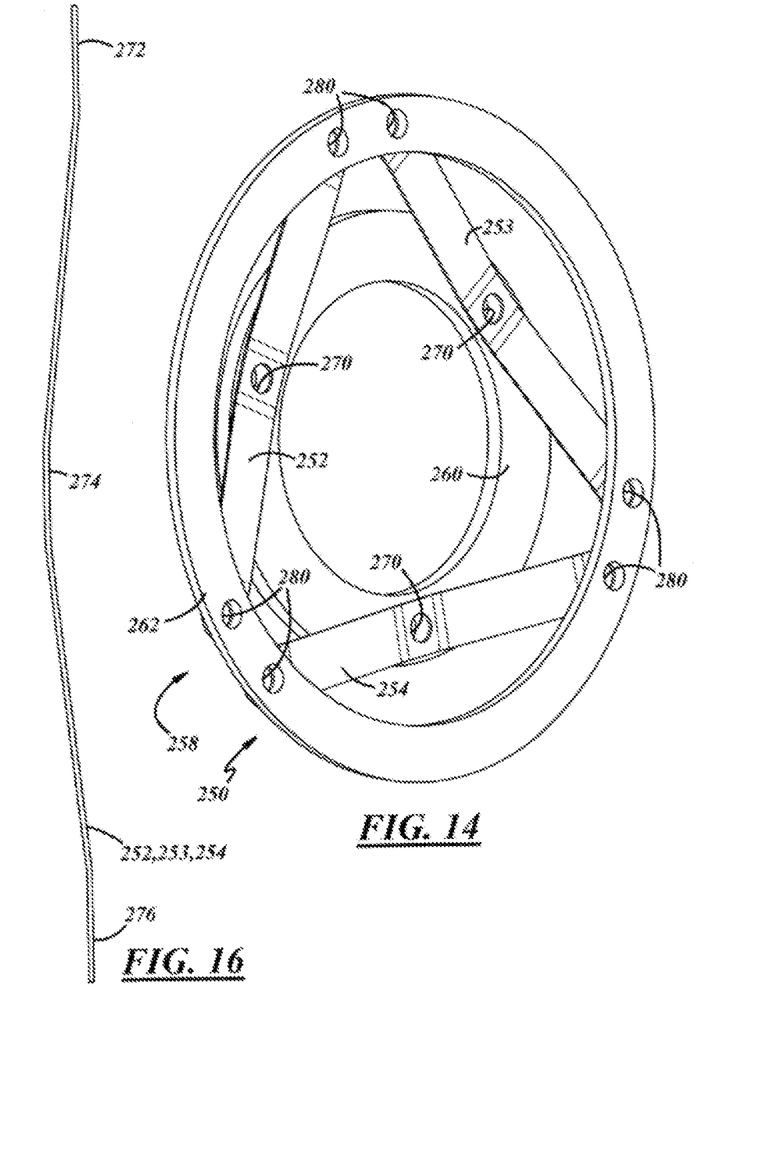
FIG. 14 schematically depicts another embodiment of a compression spring mechanism which can be used with the present invention.
FIGS. 15 AND 16 illustrate a planar and side view, respectively, of one of the buckling beam members utilized with the embodiment shown in FIG. 14.

Another "softening" compression spring mechanism is shown in FIG. 14, with one of its components being shown in FIGS. 15 and 16. This mechanism 250 has a series of three "buckling beam" spring members 252, 253, 254. The three beam spring members are also referred to collectively by the reference numeral 258. As shown in FIG. 14, the beam members 252-254 are indicated as being adapted to be attached to an inner ring member 260 and an outer ring member 262. When the beam members are used in a friction clutch mechanism, such as friction clutch member 90 described above, the ring members will be replaced by a clutch carrier member and a friction lining carrier.

When the beam spring members 258 are attached to outer ring members or carrier members, fastener members (not shown) will be positioned and secured in the aligned openings 270 and 280. The fastener members can be any conventional type, but preferably are rivets. The openings can also be positioned over swagable post members in a manner as discussed above.

As shown in FIGS. 15 and 16, each of the beam spring members 252-254 preferably are thin pieces of spring steel material having the shape and structure shown. The beam spring members have a curved shape from a side view, as shown in FIG. 16, with flat areas 272, 274, 276 where the attachment holes 273, 275, 277 are located.

The compression spring mechanism 250, or at least the group 258 of buckling beam spring members, can be used in the same manner and for the same purposes as the compression spring members 104, 104' and 164 described above. The beam spring members 258 can buckle and deform under loads when the outer and inner ring members (or the clutch carrier member and friction lining carrier member) are forced toward each other in operation of the water pump.

As indicated above, the present invention provides a "fail safe" friction clutch design. If the electrical system of the vehicle were to fail, the solenoid would be de-energized allowing the spring 104 to engage the friction clutch assembly to the clutch housing. Therefore the pump would operate in mechanical mode with the impeller driven by the pulley through the clutch assembly. The clutch is thus engaged whenever circulation of coolant is needed.

Another design feature of the present invention is its modular assembly configuration. It is common for coolant pump housings to vary widely in form and configuration from application to application. In order to accommodate this wide variation of housing configurations with minimal design changes, the hybrid pump was designed so the water pump housing 24 can be easily changed while the pulley assembly 22 and the components contained within it can remain largely unchanged.

Although the invention has been described with respect to preferred embodiments, it is to be also understood that it is not to be so limited since changes and modifications can be made therein which are within the full scope of this invention as detailed by the following claims.

What is claimed is:

1. A friction clutch assembly comprising:
   a friction lining carrier member;
   at least one friction lining member positioned on said friction lining carrier member;
   a compression spring member fixedly attached to said friction lining carrier member;
   a clutch carrier member fixedly attached to said compression spring member; and
   a flux plate positioned between said clutch carrier member and said compression spring member and attached to said friction lining carrier member;
   wherein said flux plate actuated by a solenoid can cause the spring member to compress;
   wherein the amount of force necessary to compress said compression spring member lessens over displacement once a peak amount of force has been reached;
   said compression spring member comprising an outer ring member, an inner ring member and a plurality of deformable connecting members connecting together said inner and outer ring members;
   said friction lining carrier member attached to said outer ring member, and said clutch carrier member attached to said inner ring member; and
   when said plurality of connecting members deform when said friction lining carrier member and said clutch carrier member are moved axially toward each other.

2. The friction clutch assembly as described in claim 1 further comprising:
   a solenoid for activating said friction clutch assembly; and
   a drive controller for said solenoid, said controller disengaging said clutch assembly by operating at 100% pulse width modulation to provide full current to the solenoid, and said controller significantly reducing the pulse width modulation when said clutch assembly is disengaged in order to consume less current.

3. A friction clutch assembly for a hybrid cooling pump device comprising:
   a pump housing member;
   a pulley assembly attached to said pump housing member;
   an impeller member positioned in said pump housing for pumping coolant;
   an impeller shaft connected to said impeller member;
   an electric motor positioned inside said pulley assembly and adapted to selectively rotate said impeller member;
   said friction clutch assembly positioned inside said pump housing member and adapted to selectively rotate said impeller shaft member;
   said friction clutch assembly comprising:
   a friction lining carrier member;
   at least one friction lining member positioned on said friction lining carrier member;
   a compression spring member fixedly attached to said friction lining carrier member;
   a clutch carrier member fixedly attached to said compression spring member; and
   a flux plate positioned between said clutch carrier member and said compression spring member and attached to said friction lining carrier member;
   wherein the flux plate actuated by a solenoid can cause the spring member to compress; and
   wherein said pulley assembly and said electric motor operate separately to rotate said impeller member.

4. The friction clutch assembly as described in claim 3 wherein said compression spring member comprises an outer ring member, an inner ring member, and a plurality of deformable connecting members connecting said inner and outer ring members together, and wherein when said outer and inner ring members are fixedly positioned, said connecting members can deform and provide a spring force.

5. The friction clutch assembly as described in claim 4 wherein the amount of force necessary to compress the spring member lessens over displacement once it has reached a peak amount of force.

6. The friction clutch assembly as described in claim 4 wherein said plurality of connecting members deform when said friction lining carrier member and said clutch carrier member are moved axially toward each other.

7. The friction clutch assembly as described in claim 3 wherein said compression spring member comprises a plurality of area members having openings therein and a plurality of deformable connecting members extending between and connecting together at least two of said area members.

8. The friction clutch assembly as described in claim 7 further comprising at least one ring member also connecting with a plurality of said area members.

9. The friction clutch assembly as described in claim 3 wherein an outer ring member and an inner ring member are provided, each of said outer and inner ring members connecting with separate pluralities of area members.

10. The friction clutch assembly as described in claim 3 wherein said electric motor is a brushless electric motor.

* * * * *